Sept. 28, 1926.

H. H. POWERS

LIQUID LEVEL GAUGE

Filed June 25, 1924

1,601,189

INVENTOR
H. Hale Powers.
by
Arthur B. Jenkins
ATTORNEY

Patented Sept. 28, 1926.

1,601,189

UNITED STATES PATENT OFFICE.

HERBERT HALE POWERS, OF BROOKLINE, MASSACHUSETTS.

LIQUID-LEVEL GAUGE.

Application filed June 25, 1924. Serial No. 722,407.

My invention relates to the class of devices employed for determining from outside observation the level of liquids within receptacles, and an object of my invention, among others, is the provision of a single controlling element of a device by means of which different levels of the liquid may be determined in a convenient manner, my improved gauge being especially designed for use in determining the level of oil in the crank case of an automobile engine.

One form of gauge embodying my invention and in the construction and use of which the objects herein set out, as well as others, may be attained, is illustrated in the accompanying drawings, in which—

Figure 1:
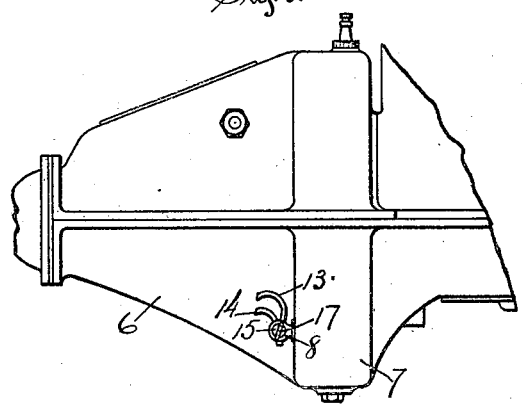
Figure 1 is a side view of a portion of the crank case of an automobile engine equipped with my improved gauge.
Figure 2:
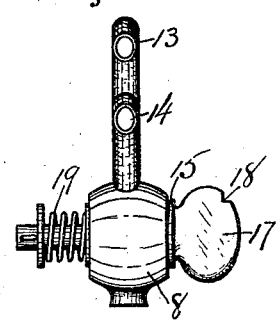
Figure 2 is an end view, scale enlarged, of my improved gauge.
Figure 3:
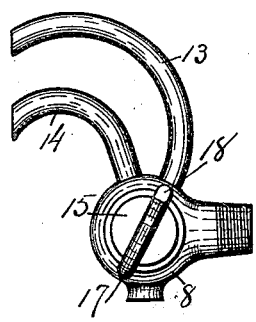
Figure 3 is a side view of the same.

A common practice at the present time in determining the oil level in an automobile engine is to provide two stop cocks, one located above the other on the crank case and providing flow of oil from the interior of such case. With such arrangement, however, if the oil level be between the two cocks, which is a satisfactory level, the valves of both cocks must be opened to determine that fact. In other words, if certain oil levels are to be determined, a plurality of valves must be operated to find such levels.

With my impoved device I have provided means whereby in the operation of a single valve a plurality of oil levels may be determined, with the device herein shown it being possible to readily determine three or more levels, and it will be readily understood from the showing made how the gauge may be changed to determine more than than three oil levels by increasing the number of ways in the valve of the stop cock and accordingly increasing the number of outlets from said stop cock.

In the drawings, the numeral 6 denotes a portion of the crank case of an automobile engine of ordinary form and construction and which includes a sump 7 to the side of which my improved gauge is attached. This gauge comprises a body 8 having an inlet port 9, a low level outlet port 10, a high level outlet port 11 and an intermediate level outlet port 12. A high level discharge spout 13 and an intermediate level discharge spout 14 project from the body, said spouts being connected respectively with the high and intermediate level outlet ports 11 and 12, and as shown in Figure 4 of the drawings.

The plug or valve 15 of the gauge is arranged to cause flow of liquid from the inlet port 9 to the low level port 10, to the high level port 11 and thence through the spout 13, or to the intermediate level port 12 and thence through the spout 14, said plug or valve having a way 16 by means of which the flow of liquid is controlled as above referred to.

Figure 4:
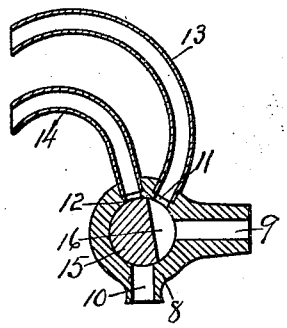
Figure 4 is a view in central vertical section.
Figure 5:
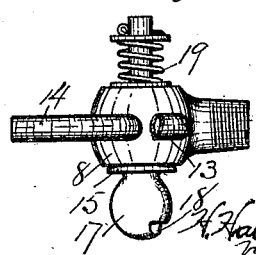
Figure 5 is a top view with the high level spout broken off.

As shown in Figure 4 the valve is turned to permit flow of oil out of the high level spout 13. If the valve be turned one step contra-clockwise the way 16 will be caused to register with the ports 9 and 12 and the flow of oil will be permitted out of the intermediate spout 14, provided the oil level in the crank case is high enough to cause flow out of said spouts. In this last position of the valve both the ports 11 and 12 are in communication with the inlet port 9, but this is immaterial, as this position of the valve will ordinarily take place only after it has been learned that the liquid will not flow out of the spout 13. Said valve may be turned so that the way 16 will register with the ports 10 and 9, in which position flow of oil will be permitted out of the port 10 to denote the low level, provided it will not flow out of the intermediate or high spouts to denote those levels.

The key 17 of the valve may be provided with an index as a notch 18 to denote its position to determine different levels, and a spring 19 may be employed to tightly seat the valve.

In accordance with the provisions of the patent statutes I have described the principles of operation of my invention, together with the devices which I now consider to represent the best embodiment thereof; but I desire to have it understood that the device shown is only illustrative and that the invention may be carried out by other means and applied to uses other than those above set out.

I claim—

1. A gauge comprising a body having a liquid inlet port and a plurality of outlet ports, a fixed discharge spout communicating with each of said outlet ports, with the discharge outlets of the various spouts located at different elevations, and a single device for controlling communication between the inlet port and the various outlet ports.

2. In a gauge, the combination with a reservoir, of a gauge body having an inlet port to receive liquid from said reservoir at a predetermined low liquid level, said body also having an outlet low level port below the low liquid level and a plurality of higher level outlet ports above said level, a fixed discharge spout communicating with each of the higher level outlet ports with the discharge outlets of the various spouts located at different elevations corresponding respectively to predetermined liquid levels of the reservoir desired to be indicated, and a single device for controlling communicating between the liquid inlet connection and the various outlet ports.

3. A gauge comprising a body having a liquid inlet port and a plurality of outlet ports opening out of the body at substantially the same level, fixed discharge spouts each communicating at one extremity with its respective outlet port, the free extremities of the various spouts being located at diffrent elevations, and means for controlling communication between the inlet port and the various outlet ports.

H. HALE POWERS.